(12) United States Patent
Guo et al.

(10) Patent No.: US 8,971,353 B2
(45) Date of Patent: Mar. 3, 2015

(54) METHOD AND APPARATUS FOR CORRECTING RATE MATCHING WEIGHTS BASED ON LAYERED MAPPING

(75) Inventors: Senbao Guo, Shenzhen (CN); Yunfeng Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 240 days.

(21) Appl. No.: 13/258,221

(22) PCT Filed: Jan. 13, 2011

(86) PCT No.: PCT/CN2011/070219
§ 371 (c)(1),
(2), (4) Date: Jul. 23, 2012

(87) PCT Pub. No.: WO2011/097969
PCT Pub. Date: Aug. 18, 2011

(65) Prior Publication Data
US 2012/0275470 A1    Nov. 1, 2012

(30) Foreign Application Priority Data

Feb. 10, 2010    (CN) .......................... 2010 1 0116333

(51) Int. Cl.
*H04J 3/16*    (2006.01)
*H04L 1/00*    (2006.01)

(52) U.S. Cl.
CPC .................................. *H04L 1/0067* (2013.01)
USPC ......................................................... 370/469

(58) Field of Classification Search
CPC ..... H04L 5/0053; H04L 5/0007; H04L 5/001; H04W 72/042; H04W 72/04
See application file for complete search history.

(56) References Cited

U.S. PATENT DOCUMENTS

| 6,898,743 | B2 | 5/2005 | Yoon et al. |
| 7,237,179 | B2 | 6/2007 | Yoon et al. |

(Continued)

FOREIGN PATENT DOCUMENTS

| CN | 101155011 A | 4/2008 |
| EA | 11429 B1 | 2/2009 |

(Continued)

OTHER PUBLICATIONS

International Search Report in international application No. PCT/CN2011/070219, mailed on Apr. 28, 2011.

(Continued)

*Primary Examiner* — Jung Park
(74) *Attorney, Agent, or Firm* — Oppedahl Patent Law Firm LLC

(57) ABSTRACT

The disclosure discloses a method for correcting rate matching weights based on layered mapping, includes: obtaining the number of layers to be layered mapped, determining a transmission mode for communication content; and according to the obtained number of layers and the determined transmission mode, correcting the weights for rate matching in R10. The disclosure also discloses an apparatus for correcting rate matching weights based on layered mapping, includes a weight correction unit, and a transmission mode determination unit and a layer number obtaining unit that are connected to the weight correction unit; wherein the transmission mode determination unit can determine the transmission mode for communication content and inform the weight correction unit of the transmission mode; the layer number obtaining unit can obtain the number of layers to be layered mapped and inform the weight correction unit of the number of layers; and according to the obtained number of layers and the determined transmission mode, the weight correction unit performs weights correction for rate matching. The method and the apparatus of the disclosure both can ensure that the weights for rate matching in R8 and R9 can be adaptable to the mapping manner in R10.

10 Claims, 1 Drawing Sheet

---

110 obtaining the number of layers to be layered mapped, determining the transmission mode for communication content

120 correcting the weights for rate matching in R10 according to the obtained number of layers and the determined transmission mode

(56) References Cited

U.S. PATENT DOCUMENTS

| | | |
|---|---|---|
| 8,396,078 B2 * | 3/2013 | Asanaka ............... 370/468 |
| 2002/0015420 A1 | 2/2002 | Yoon |
| 2003/0174782 A1 | 9/2003 | Papadias |
| 2005/0053163 A1 | 3/2005 | Yoon |
| 2005/0249163 A1 * | 11/2005 | Kim et al. ............. 370/335 |
| 2008/0317014 A1 | 12/2008 | Veselinovic et al. |
| 2009/0067543 A1 | 3/2009 | Hsiao et al. |
| 2009/0074103 A1 * | 3/2009 | Varadarajan et al. ..... 375/295 |
| 2009/0219911 A1 | 9/2009 | Blankenship et al. |
| 2009/0232050 A1 * | 9/2009 | Shen et al. ............. 370/328 |
| 2009/0304109 A1 | 12/2009 | Kotecha |
| 2012/0057529 A1 * | 3/2012 | Seo et al. .............. 370/328 |
| 2012/0189082 A1 * | 7/2012 | Zhang et al. ............ 375/299 |
| 2013/0128851 A1 * | 5/2013 | Earnshaw et al. ........ 370/329 |

FOREIGN PATENT DOCUMENTS

| | | |
|---|---|---|
| EP | 2034651 A2 | 3/2009 |
| JP | 2002208910 A | 7/2002 |
| WO | 2009036416 A2 | 3/2009 |

OTHER PUBLICATIONS

English Translation of the Written Opinion of the International Search Authority in international application No. PCT/CN2011/070219, mailed on Apr. 28, 2011.

3GPP TSG-RAN WG1 Meeting #59, CR 36.212 Introduction of enhanced dual layer transmission, South Korea, Nov. 9, 2009, 3 total pages.

Supplementary European Search Report in European application No. 11741840.0, mailed on Oct. 20, 2014.

3GPP TSG-RAN1 Meeting #71, Correction to the parameter ue-Category-v10xy, New Postcom, NEC Group, Potevio, New Orleans, Nov. 12, 2012.

* cited by examiner

METHOD AND APPARATUS FOR CORRECTING RATE MATCHING WEIGHTS BASED ON LAYERED MAPPING

TECHNICAL FIELD

The disclosure relates to a long term evolution advanced system (LTE-A), and in particular to a method and an apparatus for correcting rate matching weights based on layered mapping.

BACKGROUND

Seven downlink transmission modes are provided in the LTE R8 protocol:

transmission mode 1: single-antenna mode based on single-antenna port 0;

transmission mode 2: transmission mode based on multi-antenna transmission diversity;

transmission mode 3: large-time delay open-loop pre-coding;

transmission mode 4: closed-loop space multiplexing;

transmission mode 5: multi-user multiplexing;

transmission mode 6: pre-coding closed-loop rank=1;

transmission mode 7: beamforming based on antenna port 5.

A transmission mode 8, which refers to perform double-stream beamforming by using antenna ports 7 and 8 is further added in LTE R9 protocol besides the seven transmission modes provided by R8. However, in terms of layer mapping, multiplexing supports the mapping of one stream to two layers at maximum, and diversity supports the mapping of one stream to four layers at maximum.

It is specified as follows in R8 rate matching process:

$$N_{IR} = \left\lfloor \frac{N_{soft}}{K_{MIMO} \cdot \min(M_{DL\_HARQ}, M_{limit})} \right\rfloor$$

wherein, $N_{soft}$ is total soft channel bit; $K_{MIMO}$ is equal to 2 at transmission mode 3 or 4, otherwise KMIMO is equal to 1; $M_{DL\_HARQ}$ is the maximum re-transmission times of downlink HARQ; $M_{limit}$ is a constant.

Then, the capacity of the circulating Buffer can be calculated by using the calculated value of $N_{IR}$; in calculation of the length of output data, $E = N_L \cdot Q_m \cdot \lceil G'/C \rceil$;

wherein, E is the length of output data; $N_L$ is layered parameter; $Q_m$ corresponds to modulation manner; G' is the number of symbols of useable transmission blocks; C is the number of code blocks of one transmission block; when the transmission block is mapped to one layer for transmission, $N_L$ is equal to 1; when the transmission block is mapped to two or four layers, $N_L$ is equal to 2.

It is specified as follows in R9 rate matching process:

$K_{MIMO}$ is equal to 2 at transmission mode 3, 4 and 8, otherwise, $K_{MIMO}$ is equal to 1; the rest parameter values are the same as those in the corresponding situation of R8.

Since the multiplexing supports the mapping of one stream to two layers at maximum, and the diversity supports the mapping of one stream to four layers at maximum in terms of layer mapping in R8 and R9, therefore the specified values of $K_{MIMO}$ and $N_L$ correspond to the above layered solution. While in R10, the multiplexing is required to support the mapping of one stream to four layers at maximum, so the original weights $K_{MIMO}$ and $N_L$ for rate matching in R8 and R9 are no longer adaptable to the mapping manner in R10, thus the rate matching calculation weights need to be adjusted.

SUMMARY

In view of this, the disclosure mainly aims to provide a method and an apparatus for correcting rate matching weights based on layered mapping to ensure that the weights for rate matching in R8 and R9 can be adaptable to the mapping manner in R10.

To achieve the above purpose, the technical solution of the disclosure may be realized by:

a method for correcting rate matching weights based on layered mapping, including:

obtaining the number of layers to be layered mapped, and determining a transmission mode for communication content; and correcting the weights for rate matching in R10 according to the obtained number of layers and the determined transmission mode.

The transmission mode may include multi-layer multiplexing transmission and diversity transmission.

When the weight is $K_{MIMO}$, the correcting process may include:

correcting, for transmission modes 3, 4, 5, 8, 9 and other multi-layer multiplexing transmission modes, the $K_{MIMO}$ to 2 when one stream is mapped to two layers; correcting the $K_{MIMO}$ to 3 when one stream is mapped to three layers; and correcting the $K_{MIMO}$ to 4 when one stream is mapped to four layers; and correcting the $K_{MIMO}$ to 1 under other transmission modes.

Under the multi-layer multiplexing transmission mode and when the weight is $N_L$, the correcting process may include:

correcting the $N_L$ to 1 when one stream is mapped to one layer; correcting the $N_L$ to 2 when one stream is mapped to two layers; correcting the $N_L$ to 3 when one stream is mapped to three layers; and correcting the $N_L$ to 4 when one stream is mapped to four layers; or correcting the $N_L$ to 2 when one stream is mapped to three layers; adding, when the number of symbols in the symbol stream is not divisible by 3, one or two 0 symbols or is other filling symbols in the back of the symbol stream correspondingly; adding, when one stream is mapped to four layers and the number of symbols in the symbol stream is not divisible by 4, two 0 symbols or other filling symbols in the back of the symbol stream correspondingly; or correcting the $N_L$ to 2 when one stream is mapped to three or four layers; performing perforating processing, when the number of symbols in the symbol stream is not divisible by 3 or 4, on the original symbol stream; or correcting the $N_L$ to 3 when one stream is mapped to three or four layers; adding, when the number of symbols in the symbol stream is not divisible by 4, 0 symbols or other filling symbols to the symbol stream or performing the perforating processing on the symbol stream.

Under the diversity transmission mode and when the weight is $N_L$, the correcting process may include:

correcting the $N_L$ to 2 when one stream is mapped to two layers; correcting the $N_L$ to 4 when one stream is mapped to four layers; and correcting the $N_L$ to 8 when one stream is mapped to eight layers; or correcting the $N_L$ to 2 when one stream is mapped to four layers; adding, when the number of symbols in the symbol stream is not divisible by 4, two 0 symbols or other filling symbols in the back of the symbol stream before layered mapping, and performing perforating processing on the symbols in the time slot of the last two modulation symbols of the encoded symbol stream after diversity pre-coding; or correcting the $N_L$ to 2 when one stream is mapped to eight layers; adding, when the number of symbols in the symbol stream is not divisible by 8, Lmod8 0 symbols or other filling symbols in the back of the symbol stream before layered mapping, and performing perforating processing on the symbols in the time slot of the last Lmod8 modulation symbols of the encoded symbol stream after diversity pre-coding; or correcting the $N_L$ to 4 when one stream is mapped to eight layers; adding, when the number of symbols in the symbol stream is not divisible by 8, four 0 symbols or other filling symbols in the back of the symbol stream during mapping, and performing perforating processing on the symbols in the time slot of the last four modulation symbols of the encoded symbol stream after diversity pre-coding;

the L is the length of the symbol stream.

An apparatus for correcting rate matching weights based on layered mapping, may include a weight correction unit, and a transmission mode determination unit and a layer number obtaining unit that are connected to the weight correction unit; wherein, the transmission mode determination unit may be configured to determine the transmission mode for communication content and inform the weight correction unit of the transmission mode;

the layer number obtaining unit may be configured to obtain the number of layers to be layered mapped and inform the weight correction unit of the number of layers;

the weight correction unit may be configured to correct the weights for rate matching in R10 according to the obtained number of layers and the determined transmission mode.

The transmission mode may include multi-layer multiplexing transmission and diversity transmission; the weight correction unit may be configured to correct the weights for the multi-layer multiplexing transmission and the diversity transmission respectively.

When the weight is $K_{MIMO}$, the weight correction unit may be configured to:

for transmission modes 3, 4, 5, 8, 9 and other multi-layer multiplexing transmission modes, correcting the $K_{MIMO}$ to 2 when one stream is mapped to two layers; correcting the $K_{MIMO}$ to 3 when one stream is mapped to three layers; and correcting the $K_{MIMO}$ to 4 when one stream is mapped to four layers; and correcting the $K_{MIMO}$ to 1 under other transmission modes.

Under the multi-layer multiplexing transmission mode and when the weight is $N_L$, the weight correction unit may be configured to:

correcting the $N_L$ to 1 when one stream is mapped to one layer; correcting the $N_L$ to 2 when one stream is mapped to two layers; correcting the $N_L$ to 3 when one stream is mapped to three layers; and correcting the $N_L$ to 4 when one stream is mapped to four layers; or correcting the $N_L$ to 2 when one stream is mapped to three layers; adding, when the number of symbols in the symbol stream is not divisible by 3, one or two 0 symbols or other filling symbols in the back of the symbol stream correspondingly; adding, when one stream is mapped to four layers and the number of symbols in the symbol stream is not divisible by 4, two 0 symbols or other filling symbols in the back of the symbol stream correspondingly; or correcting the $N_L$ to 2 when one stream is mapped to three or four layers; performing perforating processing, when the number of symbols in the symbol stream is not divisible by 3 or 4, on the original symbol stream; or correcting the $N_L$ to 3 when one stream is mapped to three or four layers; adding, when the number of symbols in the symbol stream is not divisible by 4, 0 symbols or other filling symbols to the symbol stream or performing perforating processing on the symbol stream.

Under the diversity transmission mode and when the weight is $N_L$, the weight correction unit may be configured to:

correcting the $N_L$ to 2 when one stream is mapped to two layers; correcting the $N_L$ to 4 when one stream is mapped to four layers; and correcting the $N_L$ to 8 when one stream is mapped to eight layers; or correcting the $N_L$ to 2 when one stream is mapped to four layers; adding, when the number of symbols in the symbol stream is not divisible by 4, two 0 symbols or other filling symbols in the back of the symbol stream before layered mapping, and performing perforating processing on the symbols in the time slot of the last two modulation symbols of the encoded symbol stream after diversity pre-coding; or correcting the $N_L$ to 2 when one stream is mapped to eight layers; adding, when the number of symbols in the symbol stream is not divisible by 8, Lmod8 0 symbols or other filling symbols in the back of the symbol stream before layered mapping, and performing perforating processing on the symbols in the time slot of the last Lmod8 modulation symbols of the encoded symbol stream after diversity pre-coding; or correcting the $N_L$ to 4 when one stream is mapped to eight layers; adding, when the number of symbols in the symbol stream is not divisible by 8, four 0 symbols or other filling symbols in the back of the symbol stream during mapping, and performing perforating processing on the symbols in the time slot of the last four modulation symbols of the encoded symbol stream after diversity pre-coding;

the L is the length of the symbol stream.

An apparatus for correcting rate matching weights based on layered mapping, which may be located at base station side for configuring, for a terminal, a transmission mode of downlink data and the number of layers for transmitting data according to channel state information of corresponding terminal side.

The apparatus may include:

a base station side transmission mode determination unit, which is configured to determine the transmission mode configured for the terminal side;

a base station side layer number obtaining unit, which is configured to determine the number of layers of current subframe configured for the terminal side;

a base station side weight correction unit, which is configured to correct the weights for rate matching according to the number of layers and the transmission mode;

wherein the transmission mode may include multi-layer multiplexing transmission and diversity transmission; the base station side weight correction unit may be configured to correct the weights for the multi-layer multiplexing transmission and the diversity transmission respectively;

wherein under the multi-layer multiplexing transmission mode and when the weight is NL, the base station side weight correction unit may be configured to:

correcting the NL to 1 when one stream is mapped to one layer; correcting the NL to 2 when one stream is mapped to two layers; correcting the NL to 3 when one stream is mapped to three layers; and correcting the NL to 4 when one stream is mapped to four layers; or correcting the NL to 2 when one stream is mapped to three layers; adding, when the number of symbols in the symbol stream is not divisible by 3, one or two 0 symbols or other filling symbols in the back of the symbol stream correspondingly; adding, when one stream is mapped to four layers and the number of symbols in the symbol stream is not divisible by 4, two 0 symbols or other filling symbols in the back of the symbol stream correspondingly; or correcting the NL to 2 when one stream is mapped to three or four layers; performing perforating processing, when the number of symbols in the symbol stream is not divisible by 3 or 4, on the original symbol stream; or correcting the NL to 3 when one stream is mapped to three or four layers; adding, when the number of symbols in the symbol stream is not divisible by 4, 0 symbols or other filling symbols to the symbol stream or performing perforating processing on the symbol stream.

wherein under the diversity transmission mode and when the weight is NL, the base station side weight correction unit may be configured to:

correcting the NL to 2 when one stream is mapped to two layers; correcting the NL to 4 when one stream is mapped to four layers; and correcting the NL to 8 when one stream is mapped to eight layers; or correcting the NL to 2 when one stream is mapped to four layers; adding, when the number of symbols in the symbol stream is not divisible by 4, two 0 symbols or other filling symbols in the back of the symbol stream before layered mapping, and performing perforating processing on the symbols in the time slot of the last two modulation symbols of the encoded symbol stream after diversity pre-coding; or correcting the NL to 2 when one stream is mapped to eight layers; adding, when the number of symbols in the symbol stream is not divisible by 8, Lmod8 0 symbols or other filling symbols in the back of the symbol stream before layered mapping, and performing perforating processing on the symbols in the time slot of the last Lmod8 modulation symbols of the encoded symbol stream after diversity pre-coding; or correcting the NL to 4 when one stream is mapped to eight layers; adding, when the number of symbols in the symbol stream is not divisible by 8, four 0 symbols or other filling symbols in the back of the symbol stream during mapping, and performing perforating processing on the symbols in the time slot of the last four modulation symbols of the encoded symbol stream after diversity pre-coding;

the L is the length of the symbol stream.

The apparatus may further include a base station side mapping unit, which is configured to map and send data according to the weights of the base station side weight correction unit.

An apparatus for correcting rate matching weights based on layered mapping, which may be located at terminal side for determining rate matching weights needed by demapping, demodulating and decoding according to a transmission mode of downlink data and the number of layers for transmitting data configured by base station side.

The apparatus may include:

a terminal side transmission mode determination unit, which is configured to receive and determine the transmission mode configured by the base station side;

a terminal side layer number obtaining unit, which is configured to determine the number of layers configured by the base station side for the terminal side in current sub-frame;

a terminal side weight correction unit, which is configured to correct the weights for rate matching according to the number of layers and the transmission mode;

wherein the transmission mode may include multi-layer multiplexing transmission and diversity transmission; the terminal side weight correction unit may be configured to correct the weights for the multi-layer multiplexing transmission and the diversity transmission respectively;

wherein under the multi-layer multiplexing transmission mode and when the weight is NL, the terminal side weight correction unit may be configured to:

correcting the NL to 1 when one stream is mapped to one layer; correcting the NL to 2 when one stream is mapped to two layers; correcting the NL to 3 when one stream is mapped to three layers; and correcting the NL to 4 when one stream is mapped to four layers; or correcting the NL to 2 when one stream is mapped to three layers; adding, when the number of symbols in the symbol stream is not divisible by 3, one or two 0 symbols or other filling symbols in the back of the symbol stream correspondingly; adding, when one stream is mapped to four layers and the number of symbols in the symbol stream is not divisible by 4, two 0 symbols or other filling symbols in the back of the symbol stream correspondingly; or correcting the NL to 2 when one stream is mapped to three or four layers; performing perforating processing, when the number of symbols in the symbol stream is not divisible by 3 or 4, on the original symbol stream; or correcting the NL to 3 when one stream is mapped to three or four layers; adding, when the number of symbols in the symbol stream is not divisible by 4, 0 symbols or other filling symbols to the symbol stream or performing perforating processing on the symbol stream;

wherein under the diversity transmission mode and when the weight is NL, the terminal side weight correction unit may be configured to:

correcting the NL to 2 when one stream is mapped to two layers; correcting the NL to 4 when one stream is mapped to four layers; and correcting the NL to 8 when one stream is mapped to eight layers; or correcting the NL to 2 when one stream is mapped to four layers; adding, when the number of symbols in the symbol stream is not divisible by 4, two 0 symbols or other filling symbols in the back of the symbol stream before layered mapping, and performing perforating processing on the symbols in the time slot of the last two modulation symbols of the encoded symbol stream after diversity pre-coding; or correcting the NL to 2 when one stream is mapped to eight layers; adding, when the number of symbols in the symbol stream is not divisible by 8, Lmod8 0 symbols or other filling symbols in the back of the symbol stream before layered mapping, and performing perforating processing on the symbols in the time slot of the last Lmod8 modulation symbols of the encoded symbol stream after diversity pre-coding; or correcting the NL to 4 when one stream is mapped to eight layers; adding, when the number of symbols in the symbol stream is not divisible by 8, four 0 symbols or other filling symbols in the back of the symbol stream during mapping, and performing perforating processing on the symbols in the time slot of the last four modulation symbols of the encoded symbol stream after diversity pre-coding;

the L is the length of the symbol stream.

The apparatus may further include a terminal side demapping unit, which is configured to demap data, demodulate and decode the demapped data according to the weights of the terminal side weight correction unit.

It can be seen that the method and the device of the disclosure both ensure that the weights for rate matching in R8 and R9 can be adaptable to the mapping manner in R10.

The multi-layer multiplex transmission of the disclosure includes one layer of transmission or more than one layer of transmission, or includes the transmission of single-antenna port and the transmission of multi-antenna port.

DETAILED DESCRIPTION

Figure 1:
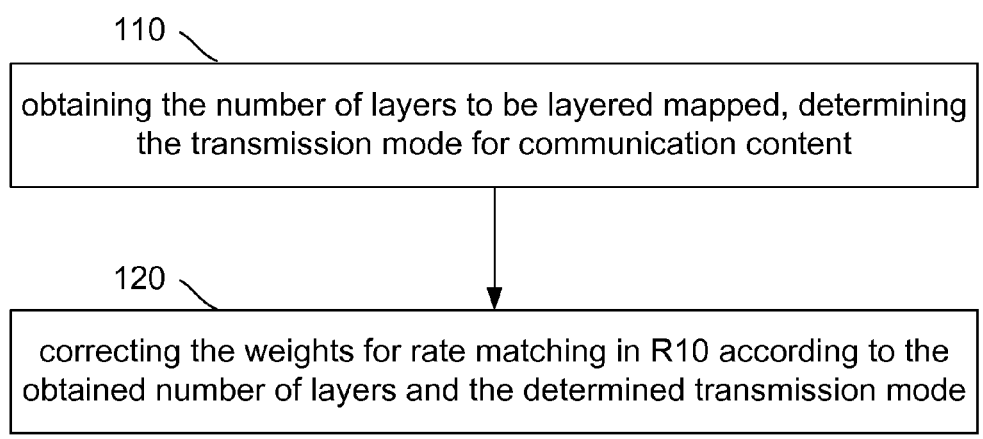
FIG. 1 shows a flowchart of correcting rate matching weights based on layered mapping of one embodiment of the disclosure.

With reference to FIG. 1, FIG. 1 shows a flowchart of correcting rate matching weights based on layered mapping of one embodiment of the disclosure. The flow includes the followings steps:

Step 110: obtaining the number of layers to be layered mapped, and determining a transmission mode for communication content.

Specifically, the above number of layers and the transmission mode can be obtained from configured resource allocation information.

Step 120: correcting the weights for rate matching in R10 according to the obtained number of layers and the determined transmission mode.

Specifically, the weights needed to be corrected generally include $K_{MIMO}$ and $N_L$. In correction of the $K_{MIMO}$, since the mapping of one stream to three layers and the mapping of one stream to four layers are added in R10, therefore the adjustment to rate matching mainly aims at these two newly added mapping manners. In addition, since the number of antennas is increased to 8, so the rate matching adjustment of transmission diversity of 8 antennas can be taken into consideration.

Since the above mapping manners are added, so new $K_{MIMO}$ value can be added in calculation of the length of circulating Buffer; because the original mapping only aims at the mapping of two layers at maximum, the $K_{MIMO}$ is 1 or 2; in terms of R10, for transmission modes 3, 4, 5, 8, 9 and other multi-layer multiplexing transmission modes, when one stream is mapped to two layers, the $K_{MIMO}$ is corrected to 2; when one stream is mapped to three layers, the $K_{MIMO}$ is corrected to 3; when one stream is mapped to four layers, the $K_{MIMO}$ is corrected to 4; and under other transmission modes, the $K_{MIMO}$ is corrected to 1.

In correction of $N_L$, when one stream is mapped to one layer, the $N_L$ is corrected to 1; when one stream is mapped to two layers, the $N_L$ is corrected to 2; when one stream is mapped to three layers, the $N_L$ is corrected to 3; when one stream is mapped to four or eight layers, the $N_L$ is corrected to 4.

If smaller change of the original $N_L$ value has to be ensured, when one stream is mapped to three layers, the $N_L$ is connected to 2, here if the number of symbols in the symbol stream is not divisible by 3, one or two 0 symbols or other filling symbols are to be added in the back of the symbol steam correspondingly; similarly, when one stream is mapped to four layers, if the number of symbols in the symbol stream is not divisible by 4, two 0 symbols or other filling symbols are to be added in the back of the symbol stream correspondingly. However in case of transmission diversity of four-layer mapping, perforating processing has to be performed on the symbols in the time slot of the last two modulation symbols of the diversity pre-coded symbol stream, while the perforating processing is not required by the multiplexing pre-coding manner. Furthermore, when one stream is mapped to three layers, the $N_L$ can also be corrected to 2; here if the number of symbols in the symbol stream is not divisible by 3, 0 symbols or other filling symbols are to be added in the back of the symbol steam correspondingly; similarly, when one stream is mapped to four layers, if the number of symbols in the symbol stream is not divisible by 4, two 0 symbols or other filling symbols are to be added in the back of the symbol stream correspondingly, and the perforating processing is not performed on the last two symbols of the symbol stream in cases of transmission diversity and precoding. Furthermore, when one stream is mapped to three or four layers, the $N_L$ can also be corrected to 2; here if the number of symbols in the symbol stream is not divisible by 3 or 4, the perforating processing has to be performed on the original symbol stream, for example: the perforating processing is performed based on a pre-defined perforating pattern, or the perforating processing is performed in a perforating manner of destroying the last two symbols. In addition, when one stream is mapped to three or four layers, the $N_L$ is corrected to 3, here if the number of symbols in the symbol stream is not divisible by 4, similar 0 symbol-adding or other filling symbol-adding or perforating processing processes as the above operation are performed on the original symbol stream.

When the transmission diversity of eight antennas is adopted, the $N_L$ is corrected to 8, 4 or 2; and when the $N_L$ is corrected to 2, if the number of symbols in the symbol stream is not divisible by 8, Lmod8 0 symbols or other filling symbols are added in the back of the symbol stream before layered mapping; the perforating processing is to be, or not to be performed on the symbols in the time slot of the last Lmod8 modulation symbols of the symbol stream after finishing the diversity pre-coding, wherein L is the length of the symbol stream. When $N_L$ is 4, if the number of symbols in the symbol stream is not divisible by 8, four 0 symbols or other filling symbols are added in the back of the symbol stream before layered mapping; the perforating processing is to be, or not to be performed on the symbols in the time slot of the last 4 modulation symbols of the symbol stream after finishing the diversity pre-coding.

Figure 2:
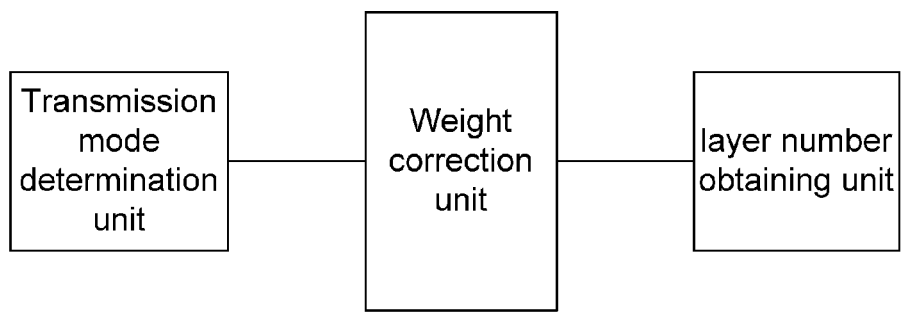
FIG. 2 shows a diagram of an apparatus for correcting rate matching weights based on layered mapping of one embodiment of the disclosure.

With reference to FIG. 2, FIG. 2 shows a diagram of an apparatus for correcting rate matching weights based on layered mapping of one embodiment of the disclosure. The apparatus includes a weight correction unit, and a transmission mode determination unit and a layer number obtaining unit that are connected to the weight correction unit. In specific application, the transmission mode determination unit is configured to determine the transmission mode for the communication content and inform the weight correction unit of the transmission mode; the layer number obtaining unit is configured to obtain the number of layers to be layered mapped and inform the weight correction unit of the number of layers; the weight correction unit is configured to correct the weights for rate matching in R10 according to the obtained number of layers and the determined transmission mode by using the above specific correction manner. The weights generally include $K_{MIMO}$ and $N_L$. Of course, in practical application, one of the weights can be corrected according to the practical application situation, It can be seen from the above that, the technology for correcting rate matching weights based on layered mapping of the disclosure, whatever the technology is applied in the method or the device, can ensure that the weights for rate matching in R8 and R9 can be adaptable to the mapping manner in R10.

The above is only the preferred embodiment of the disclosure and not intended to limit the scope of protection of the disclosure, and any modifications, equivalent replacements, improvements and the like within the spirit and principle of the disclosure shall fall within the scope of protection of the disclosure.

The invention claimed is:

1. A method for correcting rate matching weights based on layered mapping in long term evolution advanced, LTE-A, system, wherein the method comprises:

obtaining the number of layers to which one stream is mapped, and determining a transmission mode for communication content; and correcting the weights $N_L$ and/or $K_{MIMO}$ for rate matching according to the obtained number of layers to which one stream is mapped and the determined transmission mode, and outputting the corrected weights for subsequent rate matching processing; wherein the weight $N_L$ is a layering parameter, and the weight $K_{MIMO}$ is a shunting parameter;

wherein the transmission mode comprises multi-layer multiplexing transmission and diversity transmission, wherein when the weight is $K_{MIMO}$, the correcting process comprises:

correcting, for transmission modes 3, 4, 5, 8, 9 and other multi-layer multiplexing transmission modes, the $K_{MIMO}$ to 2 when one stream is mapped to two layer; correcting the $K_{MIMO}$ to 3 when one stream is mapped to three layers; and correcting the $K_{MIMO}$ to 4 when one stream is mapped to four layers; and correcting the $K_{MIMO}$ to 1 under other transmission modes;

wherein under the multi-layer multiplexing transmission mode and when the weight is $N_L$, the correcting process comprises:

correcting the $N_L$ to 1 when one stream is mapped to one layer; correcting the $N_L$ to 2 when one stream is mapped to two layers; correcting the $N_L$ to 3 when one stream is mapped to three layers; and correcting the $N_L$ to 4 when one stream is mapped to four layers; or correcting the $N_L$ to 2 when one stream is mapped to three layers; adding when the number of symbols in the symbol stream is not divisible by 3, one or two 0 symbols or other filling symbols in the back of the symbol stream correspondingly; adding, when one stream is mapped to four layers and the number of symbols in the symbol stream is not divisible by 4, two 0 symbols or other filling symbols in the back of the symbol stream correspondingly; or correcting the $N_L$ to 2 when one stream is mapped to three or four layers; performing perforating processing, when the number of symbols in the symbol stream is not divisible by 3 or 4, on the original symbol stream; or correcting the $N_L$ to 3 when one stream is mapped to three or four layers; adding when the number of symbols in the symbol stream is not divisible by 4, 0 symbols or other filling symbols to the symbol stream or performing perforating processing on the symbol stream.

2. The method according to claim 1, wherein under the diversity transmission mode and when the weight is $N_L$, the correcting process comprises:

correcting the $N_L$ to 2 when one stream is mapped to two layers; correcting the $N_L$ to 4 when one stream is mapped to four layers; and correcting the $N_L$ to 8 when one stream is mapped to eight layers; or correcting the $N_L$ to 2 when one stream is mapped to four layers; adding, when the number of symbols in the symbol stream is not divisible by 4, two 0 symbols or other filling symbols in the back of the symbol stream before layered mapping, and performing perforating processing on the symbols in the time slot of the last two modulation symbols of the encoded symbol stream after diversity pre-coding; or correcting the $N_L$ to 2 when one stream is mapped to eight layers; adding, when the number of symbols in the symbol stream is not divisible by 8, Lmod8 0 symbols or other filling symbols in the back of the symbol stream before layered mapping, and performing perforating processing on the symbols in the time slot of the last Lmod8 modulation symbols of the encoded symbol stream after diversity pre-coding; or correcting the $N_L$ to 4 when one stream is mapped to eight layers; adding, when the number of symbols in the symbol stream is not divisible by 8, four 0 symbols or other filling symbols in the back of the symbol stream during mapping, and performing perforating processing on the symbols in the time slot of the last four modulation symbols of the encoded symbol stream after diversity pre-coding;

the L is the length of the symbol stream.

3. An apparatus for correcting rate matching weights based on layered mapping, wherein the apparatus comprises a weight correction unit, and a transmission mode determination unit and a layer number obtaining unit that are connected to the weight correction unit; wherein, the transmission mode determination unit is configured to determine the transmission mode for communication content and inform the weight correction unit of the transmission mode, wherein the transmission mode comprises multi-layer multiplexing transmission and diversity transmission;

the layer number obtaining unit is configured to obtain the number of layers to which one stream is mapped and inform the weight correction unit of the number of layers;

the weight correction unit is configured to correct the weights $N_L$ and/or $K_{MIMO}$ for rate matching in long term evolution advanced, LTE-A, system, according to the obtained number of layers to which one stream is mapped and the determined transmission mode, wherein the weight $N_L$ is a layering parameter, and the weight $K_{MIMO}$ is a shunting parameter;

wherein the transmission mode determination unit, the layer number obtaining unit, and the weight correction unit comprises a plurality of circuitries, wherein when the weight is $K_{MIMO}$ the weight correction unit is configured to:

for transmission modes 3, 4, 5, 8, 9 and other multi-layer multiplexing transmission modes, correcting the $K_{MIMO}$ to 2 when one stream is mapped to two layers; correcting the $K_{MIMO}$ to 3 when one stream is mapped to three layers; and correcting the $K_{MIMO}$ to 4 when one stream is mapped to four layers; and correcting the $K_{MIMO}$ to 1 under other transmission modes;

wherein under the multi-layer multiplexing transmission mode and when the weight the weight correction unit is configured to:

correcting the $N_L$ to 1 when one stream is mapped to one layer; correcting the $N_L$ to 2 when one stream is mapped to two layers; correcting the $N_L$ to 3 when one stream is mapped to three layers; and correcting the $N_L$ to 4 when one stream is mapped to four layers; or correcting the $N_L$ to 2 when one stream is mapped to three layers; adding when the number of symbols in the symbol stream is not divisible by 3, one or two 0 symbols or other filling symbols in the back of the symbol stream correspondingly; adding, when one stream is mapped to four layers and the number of symbols in the symbol stream is not divisible by 4, two 0 symbols or other filling symbols in the back of the symbol stream correspondingly; or correcting the $N_L$ to 2 when one stream is mapped to three or four layers; performing perforating processing, when the number of symbols in the symbol stream is not divisible by 3 or 4, on the original symbol stream; or correcting the $N_L$ to 3 when one stream is mapped to three or four layers; adding when the number of symbols in the symbol stream is not divisible by 4, 0 symbols or other filling symbols to the symbol stream or performing perforating processing on the symbol stream.

4. The apparatus according to claim 3, wherein under the diversity transmission mode and when the weight is $N_L$, the weight correction unit is configured to:

correcting the $N_L$ to 2 when one stream is mapped to two layers; correcting the $N_L$ to 4 when one stream is mapped to four layers; and correcting the $N_L$ to 8 when one stream is mapped to eight layers; or correcting the $N_L$ to 2 when one stream is mapped to four layers; adding, when the number of symbols in the symbol stream is not divisible by 4, two 0 symbols or other filling symbols in the back of the symbol stream before layered mapping, and performing perforating processing on the symbols in the time slot of the last two modulation symbols of the encoded symbol stream after diversity pre-coding; or correcting the $N_L$ to 2 when one stream is mapped to eight layers; adding, when the number of symbols in the symbol stream is not divisible by 8, Lmod8 0 symbols or other filling symbols in the back of the symbol stream before layered mapping, and performing perforating processing on the symbols in the time slot of the last Lmod8 modulation symbols of the encoded symbol stream after diversity pre-coding; or correcting the $N_L$ to 4 when one stream is mapped to eight layers; adding, when the number of symbols in the symbol stream is not divisible by 8, four 0 symbols or other filling symbols in the back of the symbol stream during mapping, and performing perforating processing on the symbols in the time slot of the last four modulation symbols of the encoded symbol stream after diversity pre-coding;

the L is the length of the symbol stream.

5. An apparatus for correcting rate matching weights based on layered mapping, which is located at base station side for configuring, for a terminal, a transmission mode of downlink data and the number of layers to which one stream is mapped for transmitting data according to channel state information of corresponding terminal side, wherein the apparatus further comprises:

a base station side transmission mode determination unit, which is configured to determine the transmission mode configured for the terminal side, wherein the transmission mode comprises multi-layer multiplexing transmission and diversity transmission;

a base station side layer number obtaining unit, which is configured to determine the number of layers to which one stream is mapped of current sub-frame configured for the terminal side;

a base station side weight correction unit, which is configured to correct the weights $N_L$ and/or $K_{MIMO}$ for rate matching in long term evolution advanced, LTE-A, system, according to the number of layers to which one stream is mapped and the transmission mode, wherein the weight $N_L$ is a layering parameter, and the weight $K_{MIMO}$ is a shunting parameter;

wherein when the weight is $K_{MIMO}$ the base station side weight correction unit is configured to:

for transmission modes 3, 4, 5, 8, 9 and other multi-layer multiplexing transmission modes correcting the $K_{MIMO}$ to 2 when one stream is mapped to two layers; correcting the $K_{MIMO}$ to 3 when one stream is mapped to three layers; and correcting the $K_{MIMO}$ to 4 when one stream is mapped to four layers; and correcting the $K_{MIMO}$ to 1 under other transmission modes;

wherein under the multi-layer multiplexing transmission mode and when the weight is $N_L$ the base station side weight correction unit is configured to:

correcting the $N_L$ to 1 when one stream is mapped to one layer; correcting the $N_L$ to 2 when one stream is mapped to two layers; correcting the $N_L$ to 3 when one stream is mapped to three layers; and correcting the $N_L$ to 4 when one stream is mapped to four layers; or correcting the $N_L$ to 2 when one stream is mapped to three layers; adding when the number of symbols in the symbol stream is not divisible by 3, one or two 0 symbols or other filling symbols in the back of the symbol stream correspondingly; adding, when one stream is mapped to four layers and the number of symbols in the symbol stream is not divisible by 4, two 0 symbols or other filling symbols in the back of the symbol stream correspondingly; or correcting the $N_L$ to 2 when one stream is mapped to three or four layers; performing perforating processing, when the number of symbols in the symbol stream is not divisible by 3 or 4, on the original symbol stream; or correcting the $N_L$ to 3 when one stream is mapped to three or four layers; adding when the number of symbols in the symbol stream is not divisible by 4, 0 symbols or other filling symbols to the symbol stream or performing perforating processing on the symbol stream.

6. The apparatus according to claim 5, wherein under the diversity transmission mode and when the weight is $N_L$, the base station side weight correction unit is configured to:

correcting the $N_L$ to 2 when one stream is mapped to two layers; correcting the $N_L$ to 4 when one stream is mapped to four layers; and correcting the $N_L$ to 8 when one stream is mapped to eight layers; or correcting the $N_L$ to 2 when one stream is mapped to four layers; adding, when the number of symbols in the symbol stream is not divisible by 4, two 0 symbols or other filling symbols in the back of the symbol stream before layered mapping, and performing perforating processing on the symbols in the time slot of the last two modulation symbols of the encoded symbol stream after diversity pre-coding; or correcting the $N_L$ to 2 when one stream is mapped to eight layers; adding, when the number of symbols in the symbol stream is not divisible by 8, Lmod8 0 symbols or other filling symbols in the back of the symbol stream before layered mapping, and performing perforating processing on the symbols in the time slot of the last Lmod8 modulation symbols of the encoded symbol stream after diversity pre-coding; or correcting the $N_L$ to 4 when one stream is mapped to eight layers; adding, when the number of symbols in the symbol stream is not divisible by 8, four 0 symbols or other filling symbols in the back of the symbol stream during mapping, and performing perforating processing on the symbols in the time slot of the last four modulation symbols of the encoded symbol stream after diversity pre-coding;

the L is the length of the symbol stream.

7. The apparatus according to claim 5, further comprising a base station side mapping unit, which is configured to map and send data according to the weights of the base station side weight correction unit.

8. An apparatus for correcting rate matching weights based on layered mapping, which is located at terminal side for determining rate matching weights $N_L$ and $K_{MIMO}$ needed by demapping, demodulating and decoding according to a transmission mode of downlink data and the number of layers to which one stream is mapped for transmitting data configured by base station side,
wherein the apparatus further comprises:
a terminal side transmission mode determination unit, which is configured to receive and determine the transmission mode configured by the base station side, wherein the transmission mode comprises multi-layer multiplexing transmission and diversity transmission;
a terminal side layer number obtaining unit, which is configured to determine the number of layers to which one stream is mapped that configured by the base station side for the terminal side in current sub-frame;
a terminal side weight correction unit, which is configured to correct the weights $N_L$ and/or $K_{MIMO}$ for rate matching in long term evolution advanced, LTE-A, system, according to the number of layers to which one stream is mapped and the transmission mode, wherein the weight $N_L$ is a layering parameter, and the weight $K_{MIMO}$ is a shunting parameter;
wherein when the weight is $K_{MIMO}$ the terminal side weight correction unit is configured to:
for transmission modes 3, 4, 5, 8, 9 and other multi-layer multiplexing transmission modes, correcting the $K_{MIMO}$ to 2 when one stream is mapped to two layers; correcting the $K_{MIMO}$ to 3 when one stream is mapped to three layers; and correcting the $K_{MIMO}$ to 4 when one stream is mapped to four layers; and
correcting the $K_{MIMO}$ to 1 under other transmission modes;
wherein under the multi-layer multiplexing transmission mode and when the weight is $N_L$ the terminal side weight correction unit is configured to:
correcting the $N_L$ to 1 when one stream is mapped to one layer; correcting the $N_L$ to 2 when one stream is mapped to two layers; correcting the $N_L$ to 3 when one stream is mapped to three layers; and correcting the $N_L$ to 4 when one stream is mapped to four layers; or
correcting the $N_L$ to 2 when one stream is mapped to three layers; adding when the number of symbols in the symbol stream is not divisible by 3, one or two 0 symbols or other filling symbols in the back of the symbol stream correspondingly; adding, when one stream is mapped to four layers and the number of symbols in the symbol stream is not divisible by 4, two 0 symbols or other filling symbols in the back of the symbol stream correspondingly; or
correcting the $N_L$ to 2 when one stream is mapped to three or four layers; performing perforating processing, when the number of symbols in the symbol stream is not divisible by 3 or 4, on the original symbol stream; or
correcting the $N_L$ to 3 when one stream is mapped to three or four layers; adding when the number of symbols in the symbol stream is not divisible by 4, 0 symbols or other filling symbols to the symbol stream or performing perforating processing on the symbol stream.

9. The apparatus according to claim 8, wherein under the diversity transmission mode and when the weight is $N_L$, the terminal side weight correction unit is configured to:
correcting the $N_L$ to 2 when one stream is mapped to two layers; correcting the $N_L$ to 4 when one stream is mapped to four layers; and correcting the $N_L$ to 8 when one stream is mapped to eight layers; or
correcting the $N_L$ to 2 when one stream is mapped to four layers; adding, when the number of symbols in the symbol stream is not divisible by 4, two 0 symbols or other filling symbols in the back of the symbol stream before layered mapping, and performing perforating processing on the symbols in the time slot of the last two modulation symbols of the encoded symbol stream after diversity pre-coding; or
correcting the $N_L$ to 2 when one stream is mapped to eight layers; adding, when the number of symbols in the symbol stream is not divisible by 8, Lmod8 0 symbols or other filling symbols in the back of the symbol stream before layered mapping, and performing perforating processing on the symbols in the time slot of the last Lmod8 modulation symbols of the encoded symbol stream after diversity pre-coding; or
correcting the $N_L$ to 4 when one stream is mapped to eight layers; adding, when the number of symbols in the symbol stream is not divisible by 8, four 0 symbols or other filling symbols in the back of the symbol stream during mapping, and performing perforating processing on the symbols in the time slot of the last four modulation symbols of the encoded symbol stream after diversity pre-coding;
the L is the length of the symbol stream.

10. The apparatus according to claim 8, further comprising a terminal side demapping unit, which is configured to demap data, demodulate and decode the demapped data according to the weights of the terminal side weight correction unit.

* * * * *